March 1, 1966 P. J. MARAS 3,237,259
LOGGING HOOK
Filed Nov. 27, 1964
FIG.___1
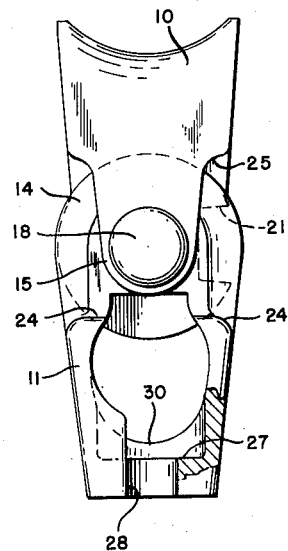
FIG.___2
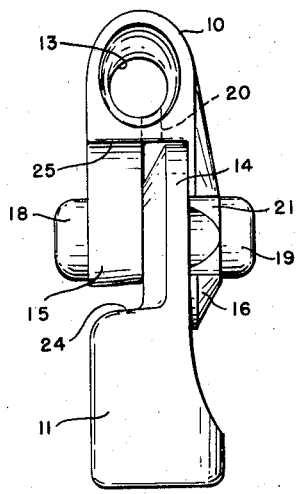
FIG.___3
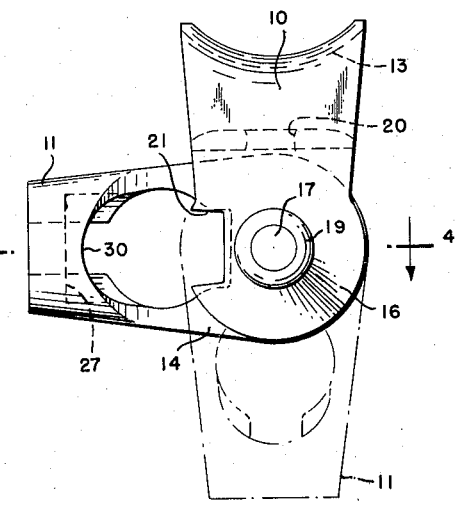
FIG.___4
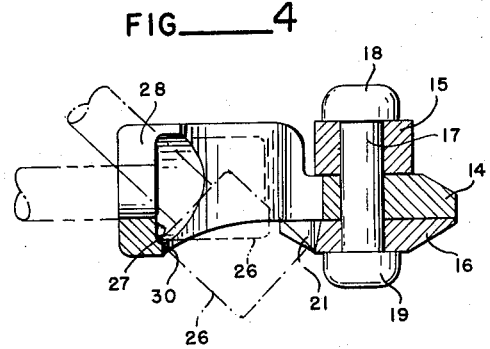
PERCY J. MARAS
INVENTOR.
BY *Seed & Berry*
ATTORNEYS

United States Patent Office 3,237,259
Patented Mar. 1, 1966

3,237,259
LOGGING HOOK
Percy J. Maras, Buckley, Wash., assignor to Garrett Enumclaw Co., a corporation of Washington
Filed Nov. 27, 1964, Ser. No. 414,361
2 Claims. (Cl. 24—123)

This invention relates to a sliding logging hook, and namely the type of logging hook providing two connecting branches one of which presents a through-opening through which a cable is reeved and the other of which presents a socket in which a ferrule is removably lodged. The cable which is reeved through the one branch may comprise either a winch line, in which case the line carries a plurality of the hooks and the ferrule which is socketed in the other branch is attached to the inner end of a respective choker line, or it may comprise the choker line and receive in said other branch a ferrule attached to the choker line's outer end. In the latter instance the axial line of the socketed ferrule tends to lie perpendicular to the axial line of the reeve-way when a choked log is subjected to a towing pull. In the former instance the drag pull of a log causes said axial line of the socketed ferrule to become cocked—usually about 45°—from said perpendicular position. In order to meet these two applications it has been the usual practice, heretofore, to employ two differently shaped hooks.

The present invention has for its general object the provision of a sliding logging block of the described type, namely one with a reeve-way in one of two connecting branches and a socket for a cable-carried ferrule in the other branch, having its two branches pivotally joined so as to be self-adapting to varying directions of line pull.

The invention further aims to provide a sliding logging hook of this nature which permits the ferrule to be removed from its socket only when the axial lines of the two connecting branches lie substantially normal to each other, a position rarely occupied by the branches under ordinary conditions of operation, thus substantially precluding accidental dislodgment.

The above and other objects and advantages in view will appear and be understood in the course of the following description and claims, the invention consisting in the novel construction and in the adaptation and combination of parts hereinafter described and claimed.

In the accompanying drawing:

FIGURE 1 is a side elevational view of a sliding logging hook constructed to embody preferred teachings of the present invention.

FIG. 2 is an end elevational view thereof.

FIG. 3 is an elevation of the hook viewed from the side thereof opposite that of FIG. 1, and showing one of the two branches swung into the position occupied when a ferrule is to be applied to or removed from its socket; and FIG. 4 is a sectional view on line 4—4 of FIG. 3. Incorporated in this view are dash-dot and dash-dash illustrations the former indicating a ferrule socketed in the hook and the latter showing the manner in which the ferrule must be swung in order to remove same from the hook.

The hook of the present invention is comprised of two cast branches 10 and 11 having articulating connection. The cable is reeved through one of these branches, and the ferrule is socketed in the other. For purposes of the present description the transverse median planes of the branches will be considered, in each instance, as a plane bisecting the related branch and including the articulating axis. The reeve-way 13 through which is slidably received a winch line or a choker line, as the case may be, is provided in the branch 10, being located at the outer or free end thereof and extending normal to said transverse median plane from one to the other of the opposite end faces of the branch. The reeve-way flares in both directions outwardly from center. The socket for the ferrule is located in the free end of the branch 11 in a position placing its axial line normal to that of the reeve-way when the two branches are located so that the transverse median planes coincide.

At its root end the branch 10 has two fork arms 15 and 16 projecting inwardly in planes parallel to the axis of the reeve-way, and loosely fitting in the space between the fork arms is a tongue 14 provided by the other branch 11. The articulation between the branches is provided by a pivot pin 17 traversing the fork arms and the tongue. The pin is given a drive fit in the fork arms, is formed with a head 18 on one end, and has a collar 19 clinched to the other end. The tongue is journaled for rotation on the pin.

Fork arm 15 has a thickness considerably greater, and a width considerably less, than the thickness and width of the fork arm 16. This greater thickness locates the inwardly facing wall in or close to a plane which includes a diameter of the reeve-way. To obviate a hard cake of dirt from collecting at the closed end of the space which tongue 14 occupies, a communicating slot 20 is provided leading to the reeve-way.

The inwardly facing wall of the wide fork arm 16 is made planar throughout its entire areal compass. The oppositely facing wall of the tongue is likewise planar and has much the same areal compass so that between the two branches there is provided a large bearing surface surrounding the pivot pin. Other than for a mutilating cut-out provided in the fork arm 16, both said fork arm and the tongue has its perimeter developed on a rather large radius concentric to the rotary axis of the pivot pin through an approximate 180° arc. The reentrant opening 21 produced by the mutilation is approximately rectangular in shape with a width moderately larger than the diameter of the ferrule which is to be socketed in branch 11 and is centered, or approximately centered, relative to a line projected radially of the pivot axis of branch 10 normal to the transverse median plane thereof.

Considering the branch 11 in profile as viewed from a side of the logging hook, the side edges lie tangent to the perimeter of the tongue and taper inwardly from the inner toward the outer end. Viewed from an end of the logging hook, one side edge of branch H includes the wide bearing face of the tongue 14 and commencing tangent with this face at the approximate root end of the tongue flares outwardly through very nearly the full length of the body proper of the branch. The other side edge includes at its inner end the opposite bearing face of the tongue 14, has at its outer end a paralleling portion flush with the outer edge of the fork arm 15, and connects said offset inner and outer portions by a sharp jog. The shoulder 24 which said jog produces is located at the substantial root juncture between the tongue and the body of branch 11 and upon swinging the branch 90° in either direction from the position in which it is shown in FIGS. 1 and 2 is brought to bear against a mating recess 25 formed in the other branch 10.

The cylindrical ferrule which is to be socketed is denoted by 26. The socket, or stall as it will be hereinafter termed, is formed to a generally cylindrical shape, moderately larger in diameter than the diameter of the ferrule, and locates its axis approximately central to the width of the tongue 14 in a plane including the axis of the pivot pin. For its thrust-taking floor the stall provides the usual U-shaped ledge 27. Defining this ledge and producing the lead-in throat to accommodate the cable to which the ferrule is attached is a radial slot 28 prolonged inwardly from the shank section of a key-hole aperture provided in the front wall of the branch, this being the wall in which the shoulder-forming jog occurs. An aperture is also provided in the back wall of the branch 11. The width of the key-hole aperture's shank section and its prolongation 28 moderately exceeds the diameter of the referred-to cable. The diameter of the circular part of the key-hole aperture moderately exceeds the diameter of the ferrule 26. Above a level approximately central to the height of the stall the back-wall aperture and the front-wall aperture have the same profile configuration, and this same profile likewise characterizes the stall where a vaulted ceiling merges with side walls which are parallel to the axial line of the stall. The portion of the back-wall aperture which lies below said level is oblong and defines a rather short back wall 30 for the closed end of the U-shaped ledge 27.

In a manner which will be apparent from an inspection of FIG. 4, insertion of the ferrule to and removal of the ferrule from the stall is performed by tipping the ferrule as shown, having first swung the branch 11 90° relative to the branch 10 so that the mutilating cut-out 21 of the latter branch is in registration with the opening which runs front to back through branch 11 at the upper end of the stall. With this registration the distance between a point on the ledge 27 about which the ferrule is rocked and the upper extreme limit of a through-opening, including the cut-out, running front to back of the hook, is moderately greater than the swing clearance which is required by the ferrule to permit such ferrule to be backed out through the back aperture into a position placing its axis in coincidence with the axis about which the circular part of the key-hole aperture is developed. Placed in this position the ferrule can then perforce be drawn through such circular opening, being shifted endwise to its axis.

The concentric rim of the fork arm 16, under all normal operating conditions, occupies at least a portion of the upper part of the back-wall aperture. It is to be noted that said rim is then in overhead approximately touching relation to the socketed ferrule so that the ferrule is not only precluded from being accidentally dislodged from the stall but is also held against endwise motion therein.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A logging hook comprised of two branches hingedly connected at their inner ends for relative swing motion about an axis occupying the approximately transverse median plane of both branches, one branch providing at its outer end a through-opening serving as a reeve-way for a cable, the other branch providing at its outer end a stall for the socketing engagement of a ferrule attached to the end of a cable, the stall having a U-shaped inwardly facing ledge serving as a thrust-taking floor and defined by a slot which is let in from the front wall of the branch as an inward prolongation of the shank portion of a key-hole aperture formed in said front wall, the circular portion of said key-hole aperture being sized to accommodate the end profile of the ferrule, the shank portion of said key-hole aperture and its prolongation being sized to accommodate the cable to which the ferrule is attached, the back wall of said ferrule-receiving branch presenting a nosing lip rising only to a moderate height above the ledge and forming the bottom limit of a back aperture, the upper part of said back aperture and the upper part of the stall having approximately the same profile as the upper one-half of the circular portion of the key-hole aperture, the lower part being shaped so that a ferrule which occupies the stall, and which it is desired to disengage from the hook, can be tilted through said back aperture to a position where its axis approximately coincides with that of the circular opening of the key-hole aperture preparatory to drawing the ferrule through said circular opening, said hinge connection comprising a pivot pin traversing a tongue provided by the branch in which the ferrule is socketed and two fork arms provided by the other branch and between which the tongue is received, one of said fork arms having its lapping end so formed that when the two branches are swung in either direction from a normal in-line position through the range of swing to which the branches are subject under normal operating conditions the perimeter of said lapping end occupies an interruptive position in the path through which the ferrule must move in order to tilt the same into said withdrawal position, the perimeter providing a mutilating cut-out so formed and positioned therein as to give to the ferrule access for its said tilt movement only when the two branches are swung to a predetermined point exceeding said normal range of swing.

2. A logging hook as claimed in claim 1 in which the tongue has a thickness less than the diameter of the ferrule and occupies a plane including the axial line of the stall.

References Cited by the Examiner

UNITED STATES PATENTS

| 1,602,611 | 10/1926 | Hickok. |
| 1,653,092 | 12/1927 | Draper. |
| 1,720,069 | 7/1929 | Yeaton. |
| 2,490,218 | 12/1949 | Kirby. |

FOREIGN PATENTS 37,657   12/1886   Germany.

WILLIAM FELDMAN, *Primary Examiner.*

BERNARD A. GELAK, *Examiner.*